(12) United States Patent
Stamm et al.

(10) Patent No.: US 7,505,040 B2
(45) Date of Patent: Mar. 17, 2009

(54) COMPOSITE CHARACTERS FONT HINTING

(75) Inventors: Beat Stamm, Redmond, WA (US); Gregory Hitchcock, Woodinville, WA (US); Michael J. Duggan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/312,945

(22) Filed: Dec. 19, 2005

(65) Prior Publication Data

US 2007/0139413 A1 Jun. 21, 2007

(51) Int. Cl.
*G06T 11/00* (2006.01)

(52) U.S. Cl. .................. 345/467; 345/468; 345/469; 345/472

(58) Field of Classification Search .......... 345/467–472
See application file for complete search history.

(56) References Cited

U.S. PATENT DOCUMENTS

| 5,416,898 | A  | * | 5/1995 | Opstad et al. | 345/468 |
| 6,600,490 | B1 | * | 7/2003 | Brock et al. | 345/472 |
| 6,762,770 | B1 | * | 7/2004 | Opstad et al. | 345/589 |
| 7,006,095 | B2 | * | 2/2006 | Frisken et al. | 345/469 |
| 7,034,830 | B2 | * | 4/2006 | Perry et al. | 345/441 |
| 7,064,757 | B1 | * | 6/2006 | Opstad et al. | 345/467 |

* cited by examiner

*Primary Examiner*—Jin-Cheng Wang (57) ABSTRACT

An auto hinting module defines typographically relevant control points and relative offset constraints for use in composite character generation. Control points in one or more dimensions are defined for each glyph component. The control points may be represented as control points on the outline of the component glyphs, although control points may also be represented by control points positioned relative to the outlines, control lines (e.g., vertical, horizontal, diagonal, etc.) that intersect the outlines, etc. A composite character font hinting module enforces offset constraints between the control points, effectively positioning one of the glyph components relative to the other.

20 Claims, 7 Drawing Sheets

COMPOSITE CHARACTERS FONT HINTING

BACKGROUND

Many computing systems can present information to a user by displaying text on a screen or some other media, such as a printed page. The physical characteristics of the human visual system and the various types and qualities of electronic display or print technology offer unique challenges to a type designer when developing typefaces in which the text can be presented.

In typography, a typeface consists of a coordinated set of character designs. A typeface is usually comprised of an alphabet of letters, numerals, punctuation marks, ideograms, and symbols (collectively referred to as characters or glyphs). Arial, Times New Roman, Verdana, and Georgia are four examples of typefaces. Traditionally, the word "font" denotes a complete typeface in a particular size (usually measured in points), weight (e.g., light, book, bold, black), and orientation (e.g., roman, italic, oblique). For a given typeface, each character typically corresponds to a single glyph, although certain characters of some typefaces may include multiple glyphs and are referred to as "composite" characters.

Generally, a glyph outline definition specifies a series of points and/or contours. A simple glyph outline may have only one contour whereas a complex glyph may have two or more contours. Furthermore, certain control characters with no visual manifestation map to glyphs with no contours.

When a glyph is to be rendered, the glyph outline is read from a font file and scaled to a specified font size (e.g., 12 point) and display resolution (e.g., 72 dpi or dots per inch). The scaled outline is then altered by font hinting instructions to correct any perceived errors introduced by the scaling process, where the interaction of font size and display resolution can result in rounding error and introduce unintended and unwanted distortion to the glyph outline. Exemplary errors may include without limitation drop-outs (i.e., unintended gaps in the glyph), unintended variations in stroke weights or character heights, etc.

Composite characters present special problems for character generation and font hinting efforts. Component glyphs are assembled into a composite character in accordance with one or more typographically irrelevant offsets to position the components relative to each other. The components of the composite character, along with the one or more typographically irrelevant offsets, are then individually scaled in accordance with a specified size and display resolution. The scaling and rounding of the one or more typographically irrelevant offsets can introduce errors, including without limitation improper spacing and/or alignment of the components relative to each other.

SUMMARY

Implementations described and claimed herein address the foregoing problems by defining and applying typographically relevant control points and relative offset constraints for composite character generation. Control points in one or more dimensions are defined for each glyph component. In one implementation, the control points are represented as control points on the outline of the component glyphs, although control points may also be represented by control points positioned relative to the outlines, control lines (e.g., vertical, horizontal, diagonal, etc.) that intersect the outlines, etc. During a stage of font hinting, offset constraints are enforced between the control points, effectively positioning one of the glyph components relative to the other, as necessary.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

Scalable outline fonts are defined as continuous shapes or outlines described by coordinates, mathematical curves, and/or other parameters. The base outlines are described in a font definition that can be read from memory (e.g., a font file or a font cache) when an individual glyph is to be displayed or otherwise output (e.g., printed). Font definitions may be based on a Cartesian grid having x and y axes in font design units (or "font units" or "funits"), although other coordinate frameworks may be employed. Using such font units, a base outline of the glyph in the specified typeface may be described without regard to the displayed glyph size or the resolution of the output device.

When a glyph is to be generated, the base outline is scaled to a specified size and then used to create a discrete raster of dots (e.g., a bitmap of pixels) on a display or hardcopy output device at the specified size. If such a bitmap is made in a simplistic way, such as by simply turning off each pixel or printer cell that has its center lying within the scaled outline, then a number of visually distracting artifacts can arise, such as misalignments of features and breaks in shapes (referred to as "drop-outs"). For example, if the glyph is scaled and rendered at a small size and/or to a low resolution display, the pixels turned on/off to represent the glyph will only grossly approximate the scaled outline because the resulting pixels are too large and discrete in nature to perfectly follow the scaled outline.

As such, additional processing, called "font hinting", may be employed to optimize the rendering of the glyph for a given size and display resolution. Font hinting instructions can be included in or associated with the font definition of each individual glyph. Font hinting provides information to the raster image processor (RIP) to enhance the rasterization of fonts. For example, font hinting may be used to alter or distort the scaled outline so as to improve the rendering. Among other uses, font hinting may be used to (1) ensure strokes intended to be equally thick appear equally thick; (2) suppress undesired overshoots (e.g., when a rounded letter, such as "O", is unintentionally scaled to appear taller than flat letters, such as "M"); (3) line up features on different glyphs that should be at the same height; (4) keep the spaces between stems open (e.g., the spaces between the vertical strokes of an "m" should be visible); (5) force consistent spacing between sets of parallel strokes; and (6) compensate for errors in the rasterization algorithm, such as errors causing drop-outs.

In the case of composite characters, which are formed from multiple component glyphs, the composite character is specified to include one or more component glyphs. By implementing composite characters, each composite character may be generated by assembling instances of component glyphs within the typeface. For example, a glyph "á" can be generated from an instance of a glyph "a " combined with an instance of a character " ". In this manner, glyph definitions can be reused for multiple characters, thereby reducing the overall size of the font storage.

In one implementation, a font file contains one or more tables that associate multiple component glyphs with a specified composite character. The individual component glyphs may be font hinted prior to being assembled into a composite character. Moreover, in one implementation, after or during assembly of the individual component glyphs, the composite character may also be font hinted to provide a typographically correct presentation.

Figure 1:
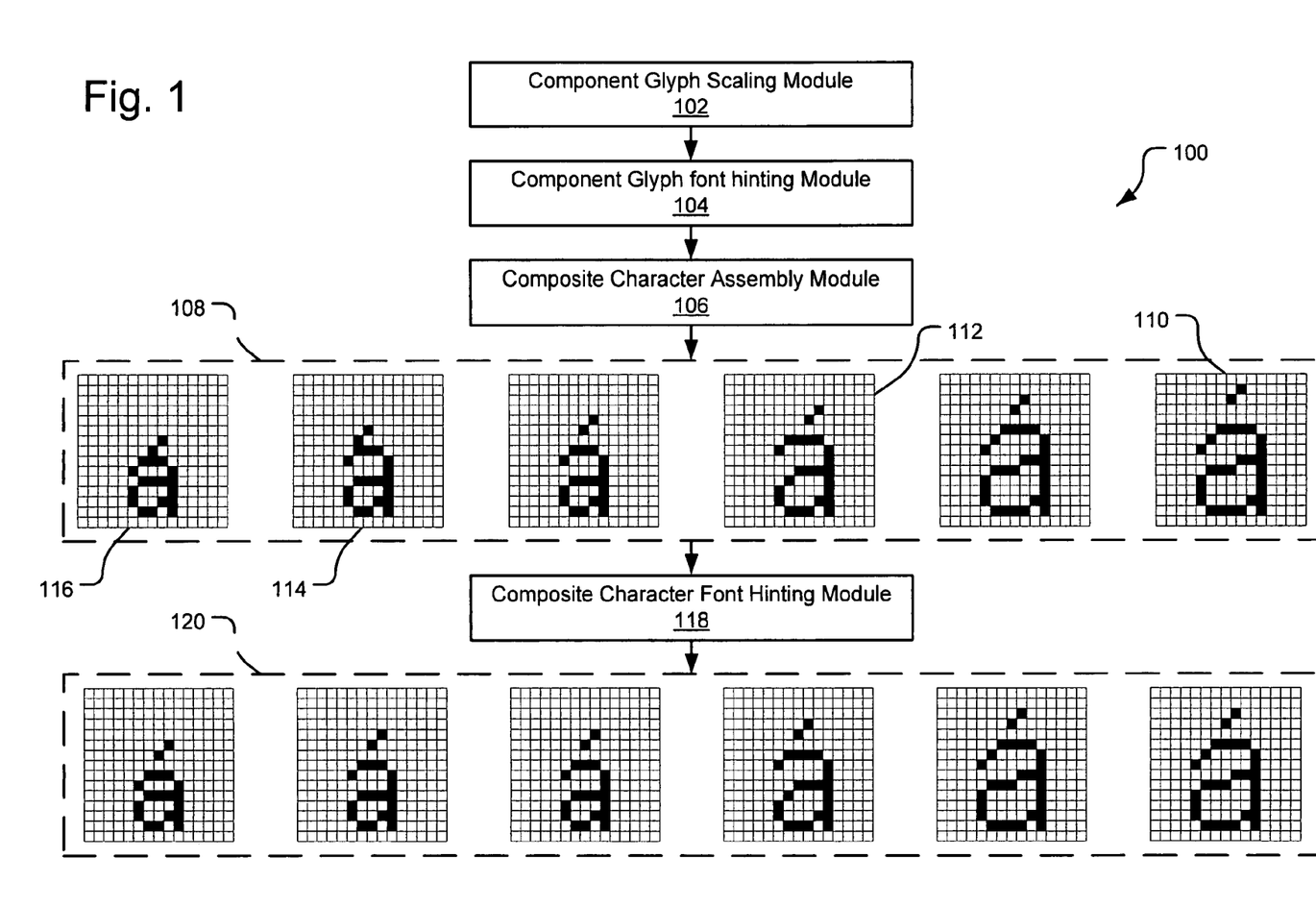
FIG. 1 illustrates an exemplary font generation system for generating composite characters.

FIG. 1 illustrates an exemplary font generation system 100 for generating composite characters. A component glyph scaling module 102 receives the outlines of component glyphs from a font library or other data source. In one implementation, an outline may be defined by a series of points in a coordinate plane that form the outline of the glyph. In other implementations, the outline may be defined by a combination of curves and points, although other definition formats are also contemplated. Curves may be defined relative to one or more reference points, which may or may not lie on the outline itself.

The component glyph scaling module 102 scales the outlines in accordance with a specified glyph size and a specified display resolution. A component glyph font hinting module 104 alters the outlines of the individual component glyphs to enforce consistency and readability of each glyph in accordance with the typeface personality.

A composite character assembly module 106 combines the individual component glyphs into a composite character (e.g., represented indirectly by rendered character set 108 showing examples of a composite character at multiple sizes). Note that the assembled example composite character 110 (Unicode+00E1) includes too large a spacing between the accent "acute" component glyph (Unicode+0301) and the lower case "a" component glyph (Unicode+0061). Likewise, the assembled example composite character 112 exhibits the accent "acute" component glyph too far to the right relative to the lower case "a" component glyph. The assembled example composite character 114 exhibits the accent "acute" component glyph too close and too far to the left relative to the lower case "a" component glyph, and the assembled example composite character 116 exhibits the accent "acute" component glyph too close to the lower case "a" component glyph.

A composite character font hinting module 118 alters the outline of the composite character to enforce composite character constraints associated with the combination of the accent "acute" component glyph (Unicode+0301) and the lower case "a" component glyph (Unicode+0061). In one implementation, the composite character font hinting module 118 receives a glyph index (e.g., an index to the glyph within a given typeface) for the composite character and executes font hinting instructions associated with this index. The font hinting instructions or the font file format may identify a control point on each component glyph and positions one of the component glyphs relative to the other component glyph, based on the relative positions of the control points and predetermined x- and y-offsets. The resulting composite character is thereby altered to provide a more appropriate positional relationship between the two component glyphs (e.g., represented indirectly by rendered character set 120 showing examples of a composite character at multiple sizes).

The modules 106 and 118 were split in the foregoing description to demonstrate effects of the composite character font hinting module 118. However, it should be understood that modules 106 and 118 may operate concurrently or be logically or physically merged, such that the assembly and the font hinting of the composite character are accomplished in the same operation or module.

Figure 2:
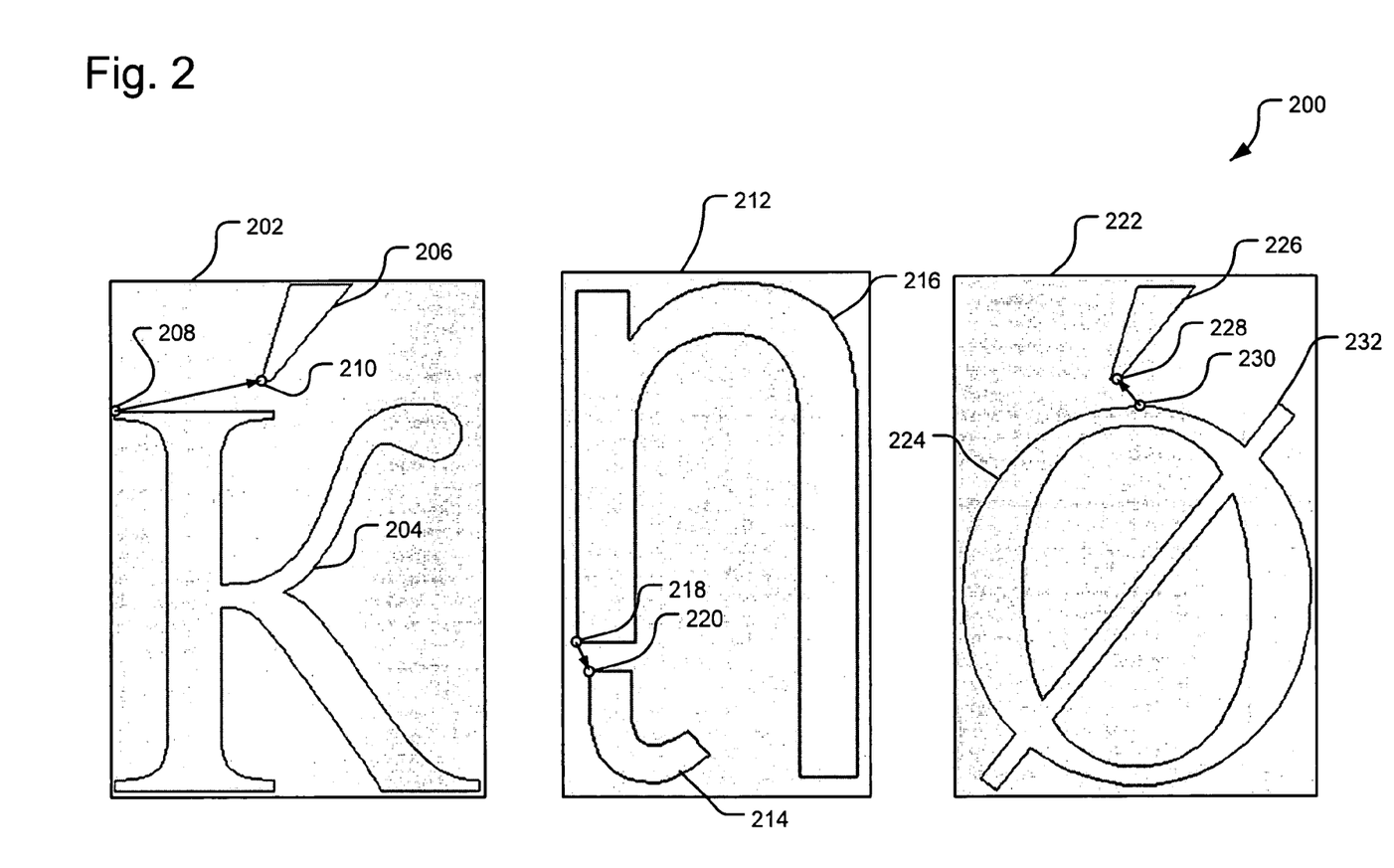
FIG. 2 illustrates exemplary composite character outlines and control points.

FIG. 2 illustrates exemplary composite character outlines 200 and corresponding control points. An auto hinting module can evaluate the composite characters of a typeface and font-hinting instructions and/or parameters for use in assembling and font hinting the individual composite characters. An example composite character 202 includes two component glyphs 204 and 206. The auto hinting module can examine the composite character 202 and identify various features of the character (e.g., vertical stems, serifs, edges, curves, etc.). In the example of composite character 202, the auto hinting module recognizes two component glyphs, one (206) being positioned "above" the other (204). During auto hinting, indices for the component glyphs may be identified and associated with the composite character.

It should also be understood that a composite character may include more than two component glyphs. In such a composite character, the component glyphs may be assembled and font hinted in a pair-wise fashion. For example, in the case of a character " ", the component glyphs " " and "°" are assembled and font hinted into an intermediate composite character "° ", and then the intermediate component character is treated as a component glyph for assembly and font hinting with the component glyph "a".

The auto hinting module also identifies certain features of the component glyphs and makes typographically relevant judgments about the relationships between them. In one implementation, the auto hinting module evaluates the points (e.g., outline points and curve reference points) associated with each component glyph. Subject to certain predefined rules, the auto hinting module selects a control point for each component glyph from these points. Example rules may include in any combination: (1) select the two closest points on each component glyph; (2) select an extreme point on each component glyph (e.g., the highest leftmost point on the lower component glyph and the lowest leftmost point on the upper component glyph); (3) select control points on significant flat horizontal edges of vertical stems over rounded edges or other insignificant features; (4) select control points on significant rounded edges of a component glyph over less significant feature; etc. It should be understood that these exemplary rules may be applied in any combination and/or order, and may be applied differently for different component glyphs or component glyph categories.

In one implementation, a control point at the extreme of the glyph in a respective direction is selected. For example, if the component glyph is an accent above a base character, a control point at the bottom extreme of the accent is selected. In addition, other criteria may be ranked to refine the selection of the control point, particularly with base component glyphs (e.g., the "a" in a composite character "á"). For example, a control point at the extreme of the glyph in one direction is first selected as a candidate. Then, one or more control points located on significant flat edges in the directional proximity of the first control point candidate are chosen as other candidates.

Given these candidates, ranked tests can be applied to select a control point. For example, first, if a line can connect an accent component control point and a control point candidate on a flat edge of a base component (without crossing over any portion of either component), then that base component control point candidate is selected. Second, if the first test fails and a candidate control point is located on the flat edge of the base component, then that base component control point candidate is selected. Third, if the first and second tests fail, then the control point at the directional extreme of the base component glyph is selected. It should be understood that other testing schemes may be employed.

In an exemplary application of these rules, a control point 208 may be selected on the component glyph 204 based on rules relating to vertical/horizontal extremes and a preference of significant flat edges of a vertical stem over rounded edges. Likewise, a control point 210 may be selected on the component glyph 206 based on rules relating to vertical/horizontal extremes. In some implementations, the control points may be identified by an x-coordinate and a y-coordinate. In another implementation, control points may be identified by a point index that references individual elements of the set of outline and/or curve points defining the component glyph, although other means of identifying control points may be employed.

Given the two selected control points, the auto hinting module determines a vector definition or offset constraint between the two control points. In one implementation, the vector definition (an offset constraint) may be defined by specifying the two control points in an array, by a vector equation between the two points, by relative offsets between the x-coordinates ($\Delta_x$) and y-coordinates ($\Delta_y$) of each component glyph, etc. The individual control points and the vector definition are stored in association with the composite character. Font hinting instructions may access this data when altering the composite character outline prior to rendering.

Another example composite character 212 includes two component glyphs 214 and 216. The auto hinting module can examine the composite character 212 and identify various features of the character (e.g., vertical stems, serifs, edges, curves, etc.). In the example of composite character 212, the auto hinting module recognizes two component glyphs, one (216) being positioned "above" the other (214). During auto hinting, indices for the component glyphs may be identified and associated with the composite character.

In an exemplary application of the auto hinting rules, a control point 218 may be selected on the component glyph 216 based on rules relating to vertical/horizontal extremes and "closeness" with the other component glyph 214. Likewise, a control point 220 may be selected on the component glyph 214 based on rules relating to vertical/horizontal extremes.

Given the two selected control points, the auto hinting module determines the vector between the two control points. The individual control points and the vector definition (an offset constraint) are stored in association with the composite character. Font hinting instructions may access this data when altering the composite character outline prior to rendering.

Another example composite character 222 includes two component glyphs 224 and 226. The auto hinting module can examine the composite character 222 and identify various features of the character (e.g., vertical stems, serifs, edges, curves, etc.). In the example of composite character 222, the auto hinting module recognizes two component glyphs, one (226) being positioned "above" the other (224). During auto hinting, indices for the component glyphs may be identified and associated with the composite character. It should be noted that tip 232 of the diagonal feature of the component glyph 224 extends higher than the main rounded edge of the component glyph 224.

In an exemplary application of the auto hinting rules, a control point 228 may be selected on the component glyph 226 based on rules relating to vertical/horizontal extremes and "closeness" with the other component glyph 224. Likewise, a control point 230 may be selected on the component glyph 224 based on rules relating to vertical/horizontal extremes, "closeness" with the other component glyph 226, and a preference for significant rounded edges over insignificant features, thereby selecting a control point on the rounded edge instead of a point on the diagonal feature.

Given the two selected control points, the auto hinting module determines the vector between the two control points. The individual control points and the vector definition (an offset constraint) are stored in association with the composite character. Font hinting instructions may access this data when altering the composite character outline prior to rendering.

It should also be understood that the auto hinting module can insert a point into a glyph definition and designate that point as a control point. For example, some font definitions are sparse and may not include a typographically relevant point on or in the proximity of the outline that can be used for the purpose of positioning component glyphs relative to each other. As such, the auto hinting module can create such a point and insert it into the glyph definition for use by the composite character font hinting module.

In yet another implementation, the auto hinting module may select multiple control points for each component glyph. For example, the left and right extremes of an accent glyph may be selected as dual control points for the accent and the left and right extremes of an "e" glyph may be selected as dual control points for the "e" glyph. Then, the font hinting module may determine an offset constraint that enforces an equal distance between the horizontal extremes of the two glyphs, on both side of the accent. In other words, the font hinting module may alter (e.g., stretch) the accent's outline to ensure that the leftmost point on the accent is k pixels from the leftmost point on the "e" character and the rightmost point on the accent is also k pixels from the rightmost point on the "e" character.

Figure 3:
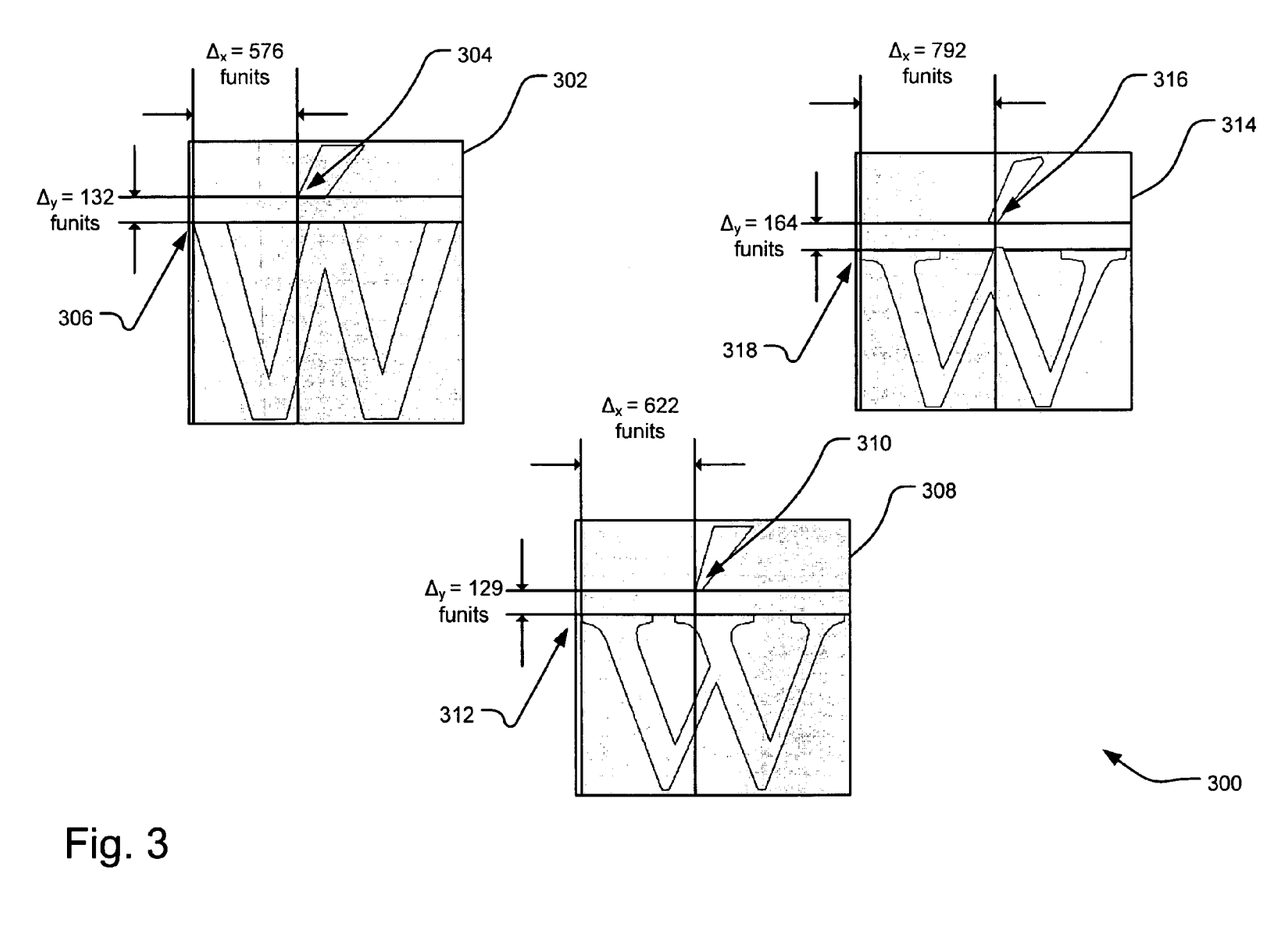
FIG. 3 illustrates exemplary composite character outlines and relative offset constraints.

FIG. 3 illustrates exemplary composite character outlines 300 and relative offset constraints. A composite character 302 has exemplary control points at 304 and 306. An exemplary offset constraint is defined by a $\Delta_x$ of 576 font units and a $\Delta_y$ of 132 font units, representing the x and y coordinate differences between the two control points. A composite character 308 has exemplary control points at 310 and 312. An exemplary offset constraint is defined by a $\Delta_x$ of 622 font units and a $\Delta_y$ of 129 font units. A composite character 314 has exemplary control points at 316 and 318. Note that the center post of the "w" character extends higher than the left and right posts. Nevertheless, using the rules that significant flat edges of stems are preferred over insignificant features, the control point is selected on the left stem. An exemplary offset constraint is defined by a $\Delta_x$ of 792 font units and a $\Delta_y$ of 164 font units. The example offsets are given as x- and y-offsets for glyph Unicode U+1e83 for fonts Arial, Times New Roman, and Palatino Linotype.

In an alternative implementation, an offset constraint may specify a ratio between the x and y coordinates of the two control points, or some other positional relationship (e.g., a control point of a first component glyph may be offset from the control point of a second component glyph by a distance of 25% of the total width of the second component). Furthermore, as discussed above, an offset constraint may be specified relative to multiple control points for one or more of the component glyphs (e.g., to enforce equal offsets on both sides of one of the glyphs, etc.).

Figure 4:
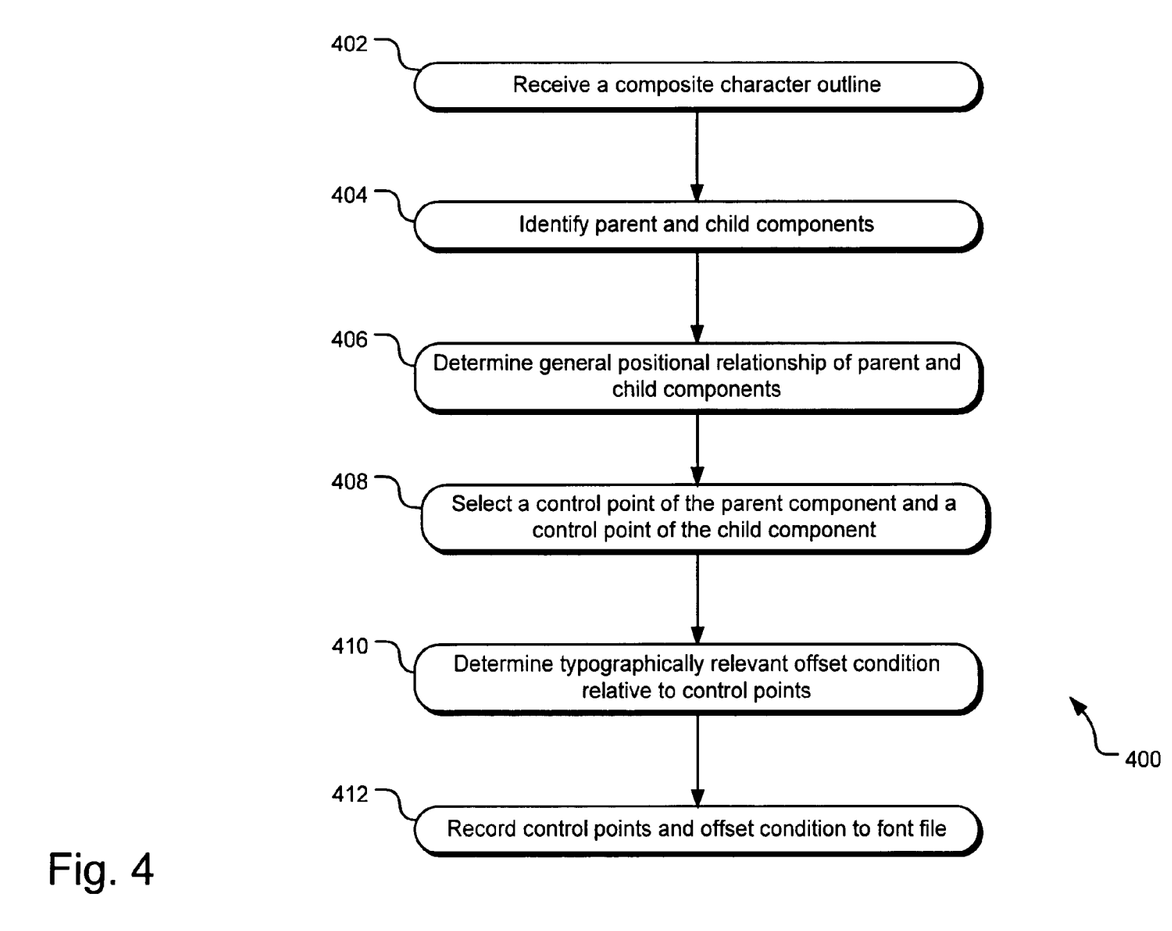
FIG. 4 illustrates exemplary operations for automated generation of font hinting instructions and/or data for a composite character.

FIG. 4 illustrates exemplary operations 400 for automated generation of font hinting instructions and/or data for a composite character. A receiving operation 402 accesses a font definition, a font file or a font cache to obtain the composite character outline. A parental identification operation 404 identifies individual component glyphs and designates one as a parent and another as a child. In one implementation, this designation may be based on parameters set in the font definition of the composite character. Alternatively, the designation may be based on relative locations of the component glyphs, the size of the component glyphs, the relation to a base line or origin in the coordinate plane, etc. In one implementation, the designation of "child" indicates the component glyph that is to be moved relative to the "parent".

A positional relationship operation 406 identifies a positional relationship of the parent and child component glyphs (e.g., child above parent, child below parent, child to left of parent, child to right of parent). In one implementation, there may also be an overlapping positional relationship (e.g., if the character "Ÿ" were represented as a composite character including "Y" and "¨"), a centered positional relationship (e.g., an equal offset distance of both sides or above and below the child glyph), etc. The positional relationship can influence the rules applied to selection of a control point. For example, a "child above parent" relationship can indicate that the auto hinting module should search vertical extreme points of each component glyph for a control point. In one implementation, comparisons of predominant x and y coordinates of each component glyph can yield a positional relationship.

A selection operation 408 selects outline points, curve points, or other reference points associated with the glyph outlines as control points. As discussed, multiple control points may be selected for a given component glyph. Furthermore, if the auto hinting module determines that a "better" point may be defined for a component glyph, it can insert the new point in the glyph definition and designate that new point as a control point.

An offset operation 410 determines a typographically relevant offset constraint relative to the control positions. In one implementation, x and y coordinate differences between the control points can constitute an offset constraint. In other implementations, offset constraints may include a ratio relationship between offsets relative to different pairs of control points, proportional offsets relative to dimensions of a component glyph or its features, and other offset constraints, such as those discussed with regard to other Figures. An offset constraint may be specified in font units, pixels, or other units. Alternatively, an offset constraint may be dimensionless (e.g., translate a first control point relative to a second control point by 25% of the width of the parent component glyph). A recording operation 412 stores the control points and the offset constraint in a persistent data store, such as a font file.

It should be understood that an offset constraint can include multiple individual constraints (e.g., one for the x coordinates and one for the y coordinate).

Figure 5:
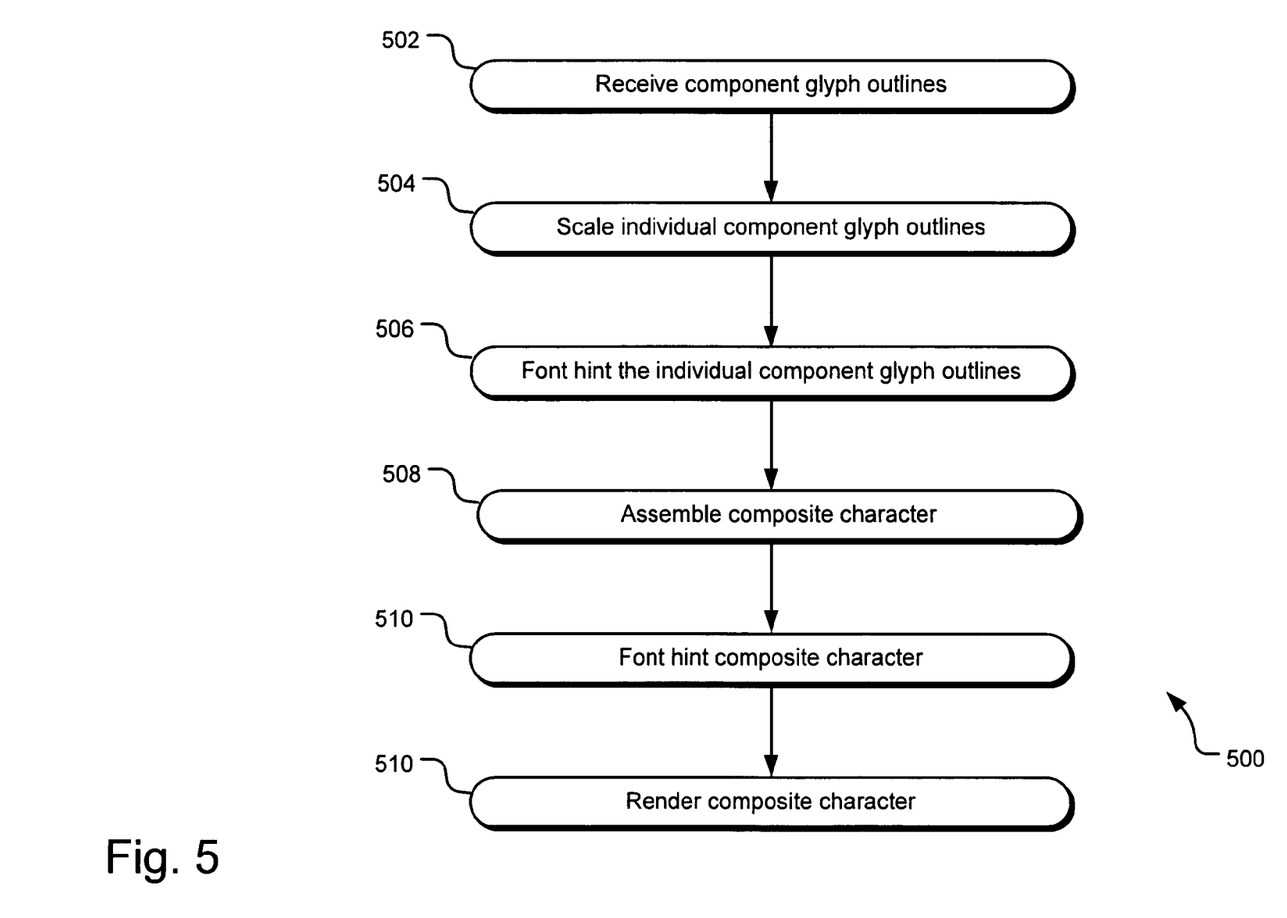
FIG. 5 illustrates exemplary operations for font hinting a composite character.

FIG. 5 illustrates exemplary operations 500 for font hinting a composite character. A receiving operation 502 receives outlines of component glyphs associated with the composite character. A scaling operation 504 scales the component glyph outlines in accordance with a specified font size, output resolution, and/or component scaling factor. A font hinting operation 506 alters the individual component glyph outlines in accordance with per-font and per-glyph font hinting instructions and parameters. Font hinting code for altering the individual component glyph outline can be associated with the component glyph in a font file.

An assembly operation 508 combines the component glyph outlines into a rough composite character. In one implementation, TrueType instructions similar to the following may be used to cause the rasterizer to assemble the composite character:

```
USEMYMETRICS[ ]
OFFSET[R], 68, 0, 0
OFFSET[R], 141, 241, 0
``` which specifies a first glyph (i.e., having a glyph index of 68 and corresponding to a glyph "a") offset by a vector having components (x, y)=(0, 0) and used as a "parent" glyph, as indicated by the USEMYMETRICS[ ] instruction, and a second glyph index (i.e., having a glyph index of 141 and corresponding to a glyph " ") offset by a vector having components (x, y)=(241, 0) and used as a "child" glyph. The resulting composite character can also be scaled after assembly.

However, the result is a "rough" composite character (see, e.g., character set 108 in FIG. 1) that could benefit from composite character font hinting because the "241 funit" offset applied above is typographically irrelevant (e.g., the designed offset is based on an arbitrary location in the coordinate plane containing a component glyph and is not based on actual features of the component glyph, which can change from component glyph to component glyph). Therefore, a composite character font hinting operation 510 alters the outlines of the component glyphs, such as by translating one component glyph relative to the other, stretching or compressing a component glyph, etc., in order to provide a more typographically correct outline of the composite character. Font hinting code for altering the composite character outline can be associated with the composite character definition in a font file. A rendering operation 512 renders the composite character based on this font hinted outline of the composite character to provide a bitmap, for example.

Example font hinting code to be executed on the rough composite character in font-hinting operation 510 is shown below:

```
SVTCA[Y]                    /* Hint in Y direction */
CALL[ ], 56, 28, 1, 1, 108, 86   /* Impose 108 funit shift between
                               control point #28 on "a" and
                               control point #56 on "''" in Y
                               direction */
SHC[2], 2                   /* Shift entire "''" outline by same
                               amount (i.e., 108 funits) in Y
                               direction */
```

-continued

```
SVTCA(X)                        /* Hint in X direction */
CALL[ ], 56, 58, 6, 40, 35, 87  /* Impose 35/64 prorated position
                                   relation between control point #40
                                   on "a" and control point #58
                                   on "´" in X direction */
SHC[2]. 2                       /* Shift entire "´" outline by same
                                   amount in X direction*/
```

A result of the example code above is to shift the acute accent component in the X and Y directions after the composite glyph is scaled. As is clear from the example code, different control codes may be used for different aspects of the typographically relevant shifting (e.g., in the X direction vs. in the Y direction). This example font hinting operation uses control points associated with the outlines of the component glyphs and typographically relevant offsets relating to these control points. In this manner, the font hinting shift imposes typographically relevant constraints between the two component glyphs.

In one implementation, a prorated position relation constraint may be applied. For example, the 35/64 constraint given above represents a number between 0 and 1 (i.e., 64/64) denoting the "percentage" position of a (vertical) median line within a range of positions from the left extreme (number=0) point to the right extreme (number=1) point of the base component.

Figure 6:
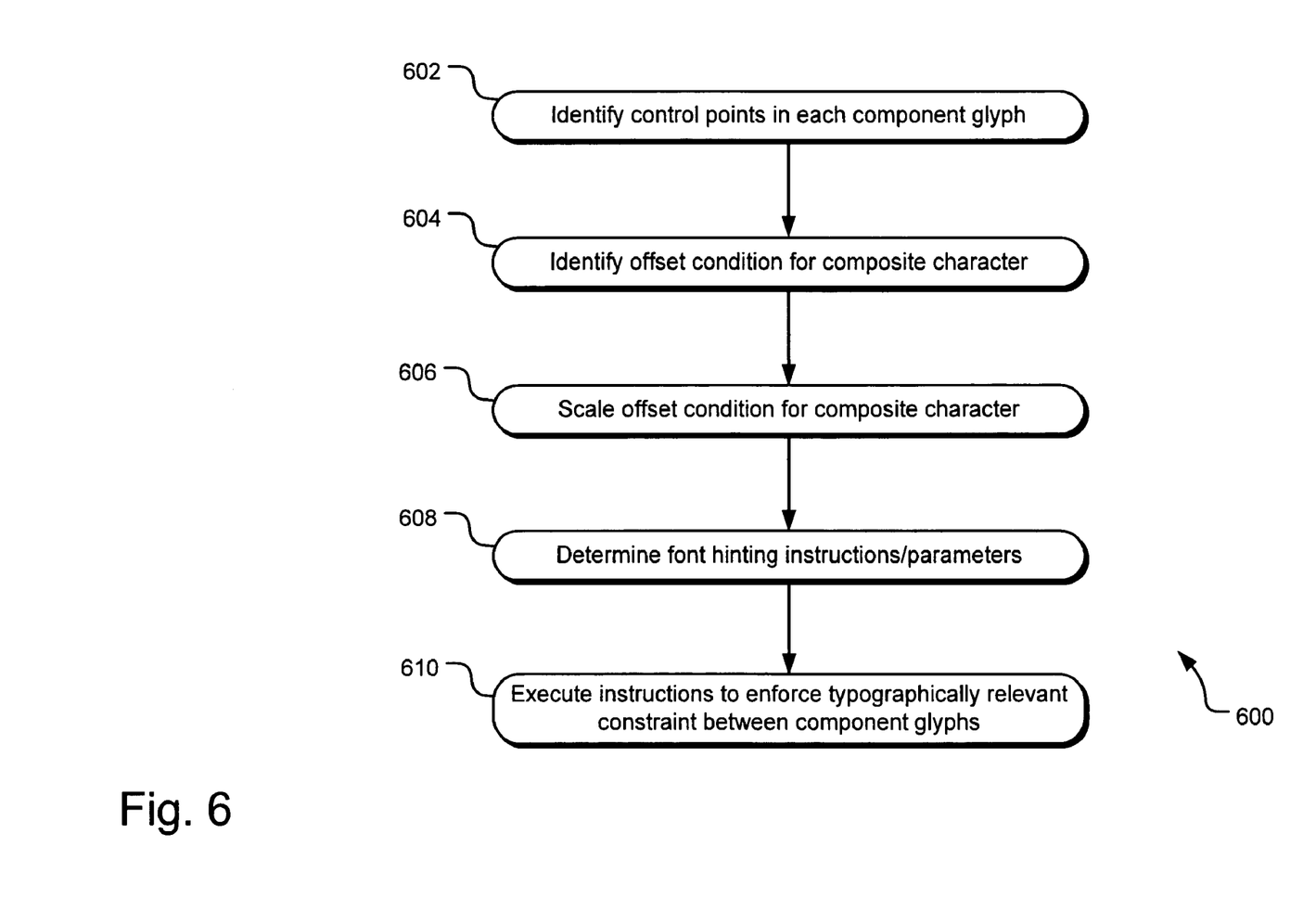
FIG. 6 illustrates exemplary detailed operations for font hinting a composite character.

FIG. 6 illustrates exemplary detailed operations 600 for font hinting a composite character. The composite character font hinting operation 510 of FIG. 5 may be implemented in accordance with the operations shown in FIG. 6, although other implementations may be employed instead. A control point operation 602 identifies the control points for each component glyph. For example, the point indices or coordinates specifying the control points may be read from the font file. An offset constraint operation 604 identifies the offset constraint. For example, the x and y coordinate offsets may be read from the font file. If the offset constraint is specified in font units, a scaling operation 606 scales the offset constraint for a specified size and output resolution, rounding the result as appropriate.

A determination operation 608 determines the font hinting instructions and/or parameters for altering the component glyph outlines or positions relative to each other. The determination operation 608 may yield one or more TrueType instructions to translate, stretch, compress, rotate, or otherwise alter the accent component glyph to enforce the offset constraint. For example, given the TrueType instructions for rendering the "á" character discussed with regard to FIG. 5, the determination operation 608 may compute the difference between the x coordinates of corresponding control points of each component glyph, add a pixel equivalent of 241 font units, and then subtract the offset constraint $\Delta_x$ to obtain a horizontal shift amount, which can be used as a parameter in one or more MSIRP[m] instructions (Move-Stack-Indirect-Relative-Point). A font hinting operation 608 executes the one or more instructions to effect the font hinting of the composite character.

Figure 7:
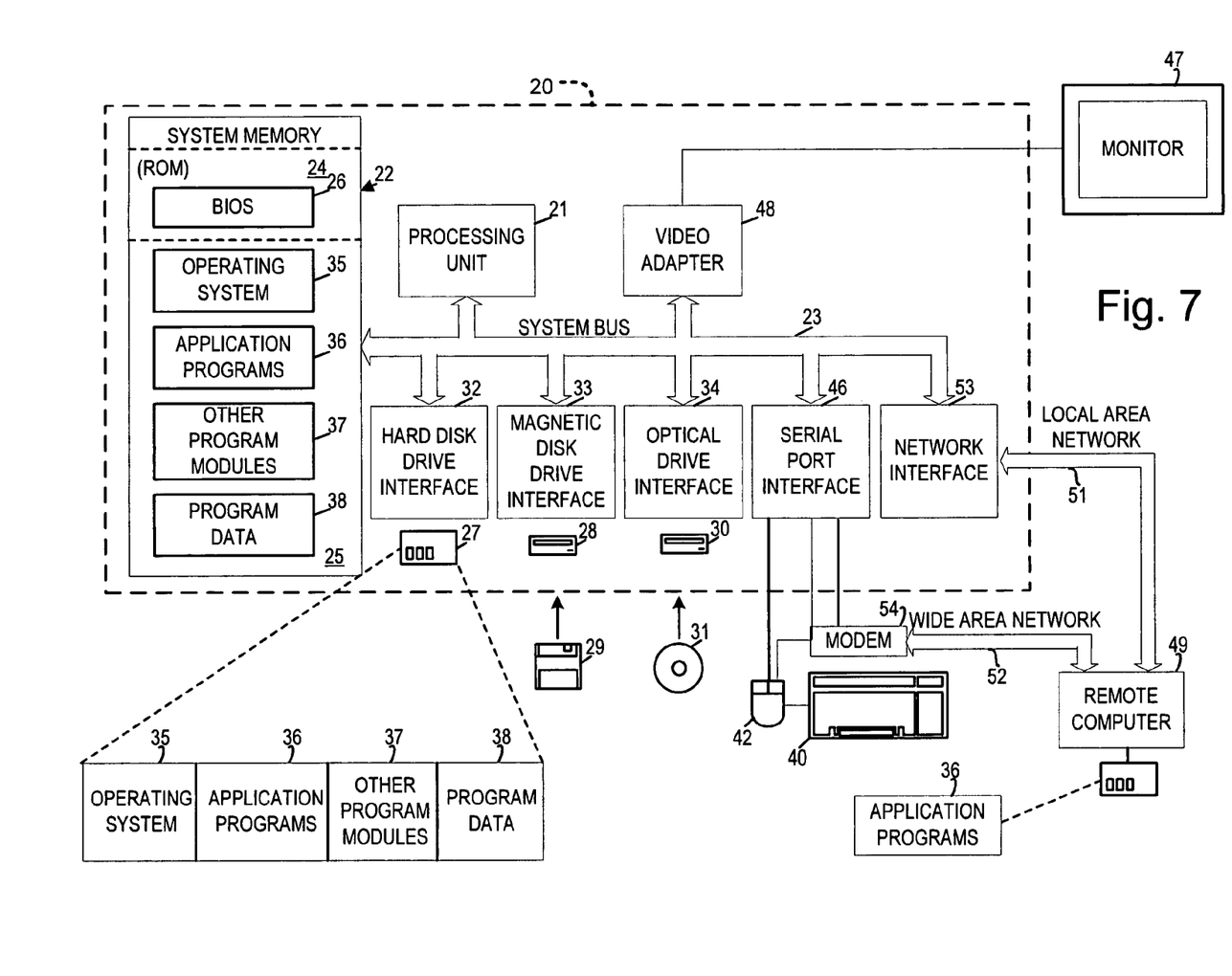
FIG. 7 illustrates an exemplary system that may be useful in implementing the described technology.

The exemplary hardware and operating environment of FIG. 7 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a scaling module, an auto hinting module, a composite character assembly module, a composite character font hinting module, a rendering module, and other modules may be embodied by instructions stored in memory 22 and/or storage devices 29 or 31 and processed by the processing unit 21. Font definitions, font hinting instructions, font properties, control point parameters, offset constraints, and other data may be stored in memory 22 and/or storage devices 29 or 31.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method for use in a computer system of generating a composite character configured for presentation by an output device, the composite character including a first component glyph and a second component glyph, each component glyph being defined by an outline, the method comprising:
   identifying, by the computer system, a first control point associated with the outline of the first component glyph and a second control point associated with the outline of the second component glyph, wherein identifying a first control point and a second control point comprises:
      determining one or more candidate control points for each of the first component glyph and the second component glyph;
      selecting the first control point from the one or more candidate control points determined for the first component glyph; and
      selecting the second control point from the one or more candidate control points determined for the second component glyph;
   receiving, by the computer system, a typographically relevant offset constraint associated with the composite character and relative to the first and second control points of the first and second component glyphs, the offset constraint including a vertical offset and a horizontal offset between the first component glyph and the second component glyph;
   scaling the outlines of the first and second component glyphs and the vertical and horizontal offsets of the offset constraint based at least in part on an output device resolution;
   assembling the scaled outline of the first component glyph and the scaled outline of the second component glyph to generate the composite character; and
   altering the assembled composite character to cause relative positions of the first control point and the second control point in the assembled composite character to satisfy the scaled offset constraint.

2. The method of claim 1 wherein the first control point is positioned on the outline of the first component glyph.

3. The method of claim 1 wherein the first control point is positioned relative to a defined curve on the outline of the first component glyph.

4. The method of claim 1 wherein the offset constraint represents a vector separating the first control point from the second control point.

5. The method of claim 1 wherein the vertical offset represents a vertical separation between the first control point and the second control point.

6. The method of claim 1 wherein the horizontal offset represents a horizontal separation between the first control point and the second control point.

7. The method of claim 1 wherein the altering operation translates the second component glyph in a vertical direction relative to the first component glyph.

8. The method of claim 1 wherein the altering operation translates the second component glyph in a horizontal direction relative to the first component glyph.

9. The method of claim 1 wherein the altering operation moves the second component glyph into a prorated position relation with the first component glyph.

10. The method of claim 1 wherein the first control point is selected at a directional extreme relative to the first component glyph.

11. The method of claim 1, further comprising, prior to assembling the outline of the first component glyph and the outline of the second component glyph, individually altering the outline of the firs component glyph and the second component glyph.

12. The method of claim 1, wherein selecting the first control point and the second control point comprises applying ranked tests to the one or more candidate control points.

13. A method for use in a computer system of generating information for altering a composite character configured for presentation by an output device, wherein the composite character includes a first component glyph and a second component glyph, each component glyph being defined by an outline, the method comprising:
- identifying, by the computer system, a first control point associated with the outline of the first component glyph and a second control point associated with the outline of the second component glyph, wherein identifying a first control point and a second control point comprises:
  - determining one or more candidate control points for each of the first component glyph and the second component glyph;
  - selecting the first control point from the one or more candidate control points determined for the first component glyph; and
  - selecting the second control point from the one or more candidate control points determined for the second component glyph;
- determining, by the computer system, a typographically relevant offset constraint associated with the composite character and being dependent on the identified first and second control points of the first and second component glyphs. the offset constraint including a vertical offset and a horizontal offset between the first component glyph and the second component glyph;
- recording the first control point, the second control point, and the offset constraint in association with the composite character; and
- scaling the outlines of the first and second component glyphs and the vertical and horizontal offsets of the offset constraint based at least in part on an output device resolution 14. The method of claim 13 wherein the first control point is located at a directional extreme of the composite character.

15. The method of claim 13 wherein the first control point is identified using at least one typographically relevant rule.

16. The method of claim 15 wherein the at least one typographically relevant rule is based on minimizing distance between the first control point and the second control point.

17. The method of claim 15 wherein the at least one typographically relevant rule is based on proffering a first type of glyph feature over a second type of glyph feature.

18. A computer system for generating a composite character configured for presentation by an output device, the composite character including a first component glyph and a second component glyph, each component glyph being defined by an outline, the computer system comprising a processing unit and computer-executable program modules stored in memory to be executed by the processor comprising:
- a composite character assembly module that assembles the outline of the first component glyph and the outline of the second component glyph to generate the composite character; and
- a composite character font-hinting module that identifies a first control point associated with the outline of the first component glyph and a second control point associated with the outline of the second component glyph, receives a typographically relevant offset constraint associated with the composite character and relative to the first and second control points of the first and second component glyphs, the offset constraint including a vertical offset and a horizontal offset between the first component glyph and the second component glyph, the composite character font-hinting module to scale the outlines of the first and second component glyphs and the vertical and horizontal offsets of the offset constraint based at least in part on an output device resolution and to alter the assembled composite character to cause relative positions of the first control point and the second control point in the assembled composite character to satisfy the scaled offset constraint associated with the composite character, wherein the first control point and the second control point are identified by:
- determining one or more candidate control points for each of the first component glyph and the second component glyph;
- selecting the first control point from the one or more candidate control points determined for the first component glyph; and
- selecting the second control point from the one or more candidate control points determined for the second component glyph.

19. The system of claim 18 wherein the composite character font-hinting module translates the second component glyph in a vertical direction relative to the first component glyph.

20. The system of claim 18 wherein the composite character font-hinting module translates the second component glyph in a horizontal direction relative to the first component glyph.

* * * * *

UNITED STATES PATENT AND TRADEMARK OFFICE
CERTIFICATE OF CORRECTION

| | | |
|---|---|---|
| PATENT NO. | : 7,505,040 B2 | |
| APPLICATION NO. | : 11/312945 | |
| DATED | : March 17, 2009 | |
| INVENTOR(S) | : Beat Stamm et al. | |

It is certified that error appears in the above-identified patent and that said Letters Patent is hereby corrected as shown below:

In column 13, line 2, in Claim 11, delete "firs" and insert -- first --, therefor.

In column 13, line 31, in Claim 13, delete "glyphs." and insert -- glyphs, --, therefor.

In column 13, line 40, in Claim 13, after "resolution" insert -- . --.

In column 13, line 49, in Claim 17, delete "proffering" and insert -- preferring --, therefor.

Signed and Sealed this
Third Day of May, 2011

David J. Kappos
*Director of the United States Patent and Trademark Office*